US012762052B2

(12) United States Patent
Kane et al.

(10) Patent No.: US 12,762,052 B2
(45) Date of Patent: Oct. 13, 2026

(54) LOGICAL-TO-PHYSICAL MAPPING FOR ZONED NAMESPACE MEMORY SYSTEMS WITH A DATA CACHE

(71) Applicant: Micron Technology, Inc., Boise, ID (US)

(72) Inventors: John J. Kane, Westminster, CO (US); Paul Roger Stonelake, Kihei, HI (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/209,259

(22) Filed: May 15, 2025

(65) Prior Publication Data

US 2025/0363049 A1 Nov. 27, 2025

Related U.S. Application Data

(60) Provisional application No. 63/651,298, filed on May 23, 2024.

(51) Int. Cl.
*G06F 12/02* (2006.01)
*G06F 12/0831* (2016.01)
(Continued)

(52) U.S. Cl.
CPC ...... *G06F 12/0246* (2013.01); *G06F 12/0833* (2013.01); *G06F 12/0868* (2013.01); *G06F 12/0871* (2013.01)

(58) Field of Classification Search
CPC ............. G06F 12/0246; G06F 12/0833; G06F 12/0868; G06F 12/0871; G06F 2212/1016;
(Continued)

(56) References Cited

U.S. PATENT DOCUMENTS

2020/0104252 A1 4/2020 Subbarao
2021/0089217 A1 3/2021 Bjørling et al.
(Continued)

FOREIGN PATENT DOCUMENTS

CN 110502455 A 11/2019

OTHER PUBLICATIONS

"International Search Report and Written Opinion of the International Searching Authority," issued in connection with Int'l Appl. No. PCT/US2025/030413, dated Sep. 10, 2025 (13 pages).

*Primary Examiner* — Michael Alsip
(74) *Attorney, Agent, or Firm* — Holland & Hart LLP

(57) ABSTRACT

Methods, systems, and devices for logical-to-physical (L2P) mapping for zoned namespace (ZNS) memory systems are described. A memory system may include a cache, such as a single-level cell (SLC) cache in front of a quad-level cell (QLC) non-volatile memory device. The cache may include a multiple layer L2P table to map logical block addresses (LBAs) of data to physical addresses of the cache. In some examples, the L2P table may be sparsely populated to hold a quantity of LBAs corresponding to a quantity of open zones, and may be organized into groups of L2P entries to address a full logical space of the memory device. L2 Region boundaries may be aligned on zone boundaries by utilizing an integer quantity of L2 regions for each zone, an integer quantity of L2P entries per L2 region, or both, to reduce complexity and write amplification while improving performance.

30 Claims, 6 Drawing Sheets

(51) Int. Cl.
*G06F 12/0868* (2016.01)
*G06F 12/0871* (2016.01)

(58) Field of Classification Search
CPC ..... G06F 2212/7203; G06F 2212/7206; G06F 2212/7201; G06F 2212/7204; G06F 2212/7208
See application file for complete search history.

(56) References Cited

U.S. PATENT DOCUMENTS

| | | | |
|---|---|---|---|
| 2021/0342267 | A1 | 11/2021 | Lam et al. |
| 2021/0374067 | A1* | 12/2021 | Helmick ............. G06F 12/0246 |
| 2022/0004496 | A1 | 1/2022 | Ha |
| 2022/0261180 | A1* | 8/2022 | Shin ...................... G06F 3/0656 |
| 2023/0367708 | A1* | 11/2023 | V M ................... G06F 12/0246 |
| 2024/0070086 | A1* | 2/2024 | Muthya Narahari ... G06F 12/10 |
| 2024/0094903 | A1* | 3/2024 | Kavirayani ........... G06F 3/0631 |

* cited by examiner

600

LOGICAL-TO-PHYSICAL MAPPING FOR ZONED NAMESPACE MEMORY SYSTEMS WITH A DATA CACHE

CROSS REFERENCE

The present application for patent claims priority to U.S. Patent Application No. 63/651,298 by Kane, entitled "LOGICAL-TO-PHYSICAL MAPPING FOR ZONED NAMESPACE MEMORY SYSTEMS WITH A DATA CACHE," filed May 23, 2024, which is assigned to the assignee hereof, and which is expressly incorporated by reference in its entirety herein.

TECHNICAL FIELD

The following relates to one or more systems for memory, including logical-to-physical (L2P) mapping for zoned namespace (ZNS) memory systems with a data cache.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
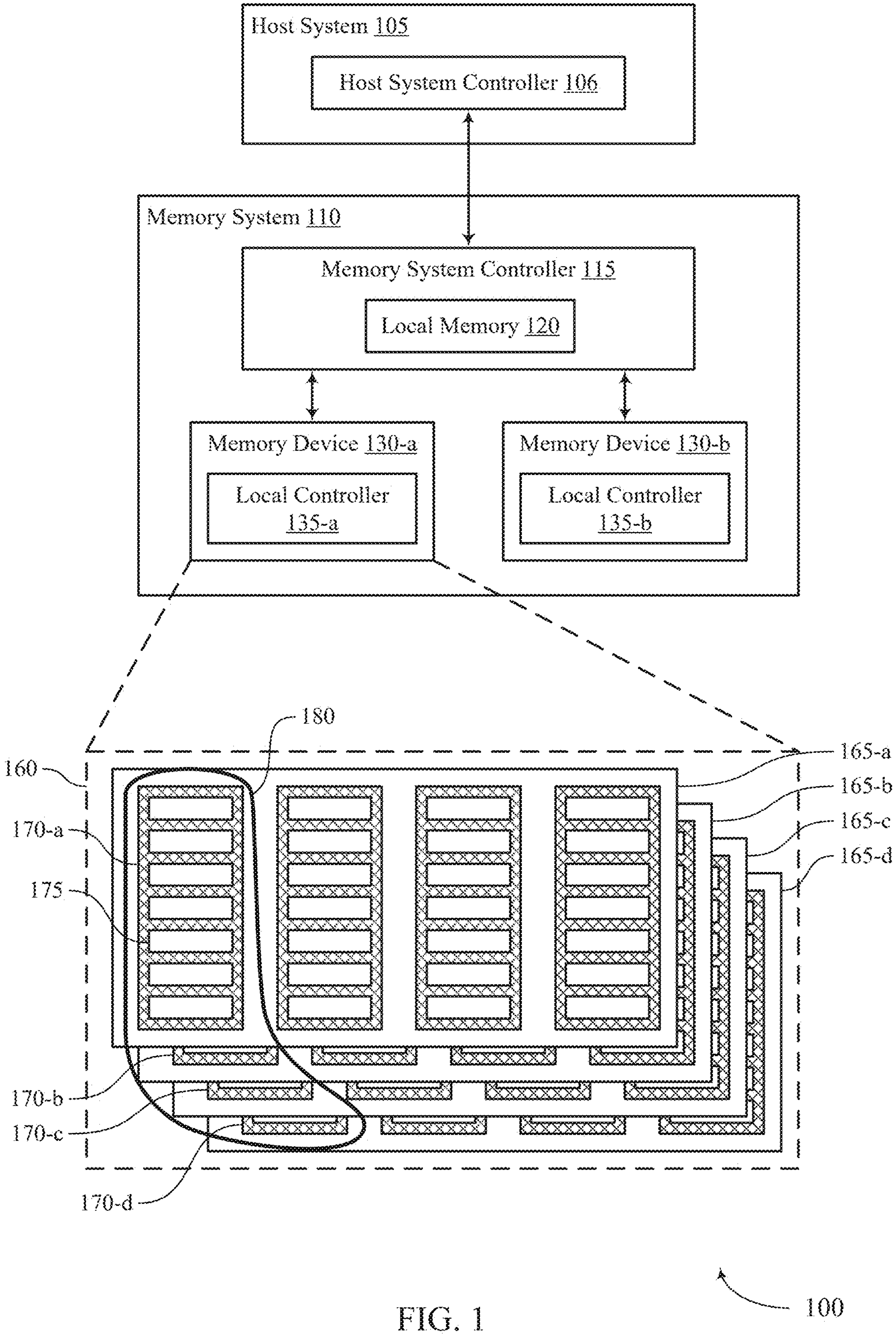
FIG. 1 shows an example of a system that supports logical-to-physical (L2P) mapping for zoned namespace (ZNS) memory systems with a data cache in accordance with examples as disclosed herein.

Some memory systems (e.g., multi-level memory cell (MLC) solid state drives (SSDs), or other types of memory systems) may utilize a cache to temporarily store data received from a host system prior to writing the data to one or more memory arrays (e.g., non-volatile memory of the system). Such a memory system may operate according to one or more different firmware architectures to facilitate storing and maintaining data in the cache and the one or more memory arrays. For example, a memory system may operate at least the one or more memory arrays according to a zoned namespace (ZNS) architecture, where data may be stored across one or more zones within the one or more memory arrays. Such zones may be configured in accordance with an organizational size that supports maintaining contiguous portions of information (e.g., sequential information) in storage, which may reduce an amount of metadata and other mapping information to be maintained for the data as compared with other storage architectures. In some examples, the cache may include or otherwise be associated with block-based storage or some other type of storage and firmware architecture. Data in the cache may thereby be mapped from logical addresses to physical addresses using one or more logical-to-physical (L2P) entries (e.g., a two-layer L2P table format) stored in the cache or elsewhere in the memory system (e.g., within one or more volatile memory cells, or some other location). In some cases, writing to the cache, maintaining the L2P entries for the cache data, and subsequently transferring the data from the cache to the ZNS memory arrays may increase background processes for transferring data to long term storage, which may increase write amplification, reduce memory storage efficiency, and reduce some aspects of system performance, among other examples.

Techniques described herein provide for a memory system to support methods to improve memory system performance and memory storage efficiency by modifying a structure of the L2P entries for the cache within a ZNS-based memory system (e.g., an SLC cached ZNS-based SSD). For example, by aligning regions of the L2P entries (e.g., L2 regions) with zone boundaries within the ZNS-based memory arrays and sparsely populating the L2P entries, the memory system may leverage the zone-based memory array architecture to reduce complexity, storage, and write amplification associated with the cache, among other examples. An address space mapped by the L2P entries may be sparsely populated to hold enough logical block addresses (LBAs) that fit into the cache for a quantity of one or more open zones within the memory arrays (e.g., closed zones may not be tracked). The L2P entries may thereby not map an entire address space of the drive at least because the memory arrays may be zone-based, such that the L2P entries be sparsely populated and remaining entries may be unused and empty to improve storage efficiency.

The L2P entries may be arranged into L2 regions, or groups of L2P entries, each associated with a respective zone of the one or more open zones in the memory arrays, where an open zone refers to a zone of data that is subject to at least a threshold amount of accesses by a host system within a given time period. Because the L2 regions of the L2P entries are associated with open zones, the L2P table as a whole may address a full logical space of the drive, but sparse L2 region use for the open zones may include only a subset of entries that store mapping information, while other entries associated with closed zones include null data or are otherwise unused to improve storage efficiency (e.g., reduce memory utilization in the cache or some other volatile memory location that stores the L2P entries). Boundaries of logical addresses of the L2 regions may be aligned with zone logical address boundaries to further improve performance by utilizing an integer quantity of L2 regions for each zone, an integer quantity of L2P entries per L2 region, or both. By aligning table tracking boundaries (e.g., L2 region boundaries, or groups of L2P entries) to logical zone boundaries and sizes, complexity in table tracking and management, as well as write amplification, may be reduced while achieving relatively higher user performance (e.g., higher quality of service (QOS)).

In addition to applicability in memory systems as described herein, techniques for L2P mapping for ZNS memory systems with a data cache may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by reducing a size of an L2P table, resulting in utilization of less memory (e.g., volatile and/or non-volatile memory) for storage, which may improve performance of SSD systems and related programs. Additionally, or alternatively, aligning L2 region boundaries as described herein may reduce write amplification to extend a life of SSD systems, among other benefits. In some examples, increased efficiency and closer alignment in storage for L2P tables may increase memory storage and capacity overall, thereby supporting improved AI and analytics performance.

Features of the disclosure are illustrated and described in the context of systems, devices, and circuits. Features of the disclosure are further illustrated and described in the context of data storage schemes, data mapping schemes, and flowcharts.

FIG. 1 shows an example of a system 100 that supports L2P mapping for ZNS memory systems with a data cache in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses, such as logical block addresses (LBAs), associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update an L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples of the system 100, the system 100 may support storing data according to a ZNS architecture. Such storage may include a memory system 110 opening a zone within a memory array of a memory device 130 for storing contiguous portions of information. The zone may be opened within a block of multiple-level memory cells, such as QLCs, or some other type of multiple-level cells, and the memory system 110 may store zone data (e.g., user data) to the zone. In some cases, the memory device 130 may be an example of a NAND SSD including ZNS SSD storage. ZNS may, in some cases, allow applications to sequentially write data into distinct zones to improve data placement and management, and may eliminate garbage collection by allowing further collaboration between devices.

To support accurate storage of data within the multiple-level memory cells, the memory system 110 may perform two-pass programming (e.g., a coarse programming operation followed by a fine programming operation). However, such programming may incur relatively high latency at the memory system, which may prevent host data from being directly written to the QLC blocks (e.g., due to the latency inhibiting the memory system 110 from matching the data transfer speed from the host system 105). To prevent losing host data, the memory system 110 may include an Intermediate layer of blocks (e.g., SLC blocks or some other type of blocks) and may utilize the blocks as a cache layer to store host data before the host data is written to the QLC blocks. For example, the memory system 110 may flush data from the cache layer to the QLC blocks as a background process. The cache layer may operate similar to other block devices of the memory system 110 such that data is addressed according to LBAs and translation units (TUs), which may have a size in bytes, kilobytes (KBs), etc. (e.g., an addressable unit of data having a fixed size, such as 4 KB) and an L2P table may provide information about where data is present in NAND storage. Once the data is stored to the QLC blocks, the data and corresponding zones may be addressed by a separate zone management table (ZMT) maintained by the memory system. In some examples, SLC caching may refer to holding data in SLC NAND memory cells so the data may be migrated to QLC in background (e.g., enabling QLC memory to utilize multi pass programming with a specific page ordering).

In some examples, the intermediate layer of blocks of the cache may represent one or more blocks of one or more memory devices 130 (e.g., a NAND device) that may be the same as or different than one or more memory devices 130 including the QLC blocks. Additionally, or alternatively, the cache may be stored within volatile memory, such as within the local memory 120 (e.g., within internal DRAM or SRAM), or within an outside DRAM source. An L2P table for the cache may similarly be stored within the cache itself within a memory device 130 or local memory 120, or separately within one or more memory devices 130 or the local memory 120. In some cases, a cache may refer to a single physical cache, such as a local memory 120, or a logical cache including multiple physical cache locations. For example, a cache may refer to one or more portions of a local memory 120 holding an L2P table and one or more blocks within one or more memory devices 130 holding a cache corresponding to (e.g., that is mapped by) the L2P table.

Utilizing such a cache and corresponding L2P table may increase write amplification, volatile and/or non-volatile memory storage requirements, and may lower some aspects of user performance, among other examples. In some examples, the ZNS structure of the memory within the memory system 110 may be leveraged to reduce such issues (e.g., on ZNS drives) utilizing one or more methods as described herein. For example, the memory system 110 may support utilization of a sparsely populated L2P table covering a cache in front of a full ZNS SSD to reduce memory storage usage. Further, by arranging the L2P table into multiple layers (e.g., two or more layers) with a part (e.g., L2 part, L2 region) of the table arranged into groups (e.g., groups of L2 Regions) including logical addresses that are aligned with zone boundaries, code complexity may be reduced while also increasing drive performance and reducing overall write amplification on cached ZNS SSDs, among other examples.

Figure 2A:
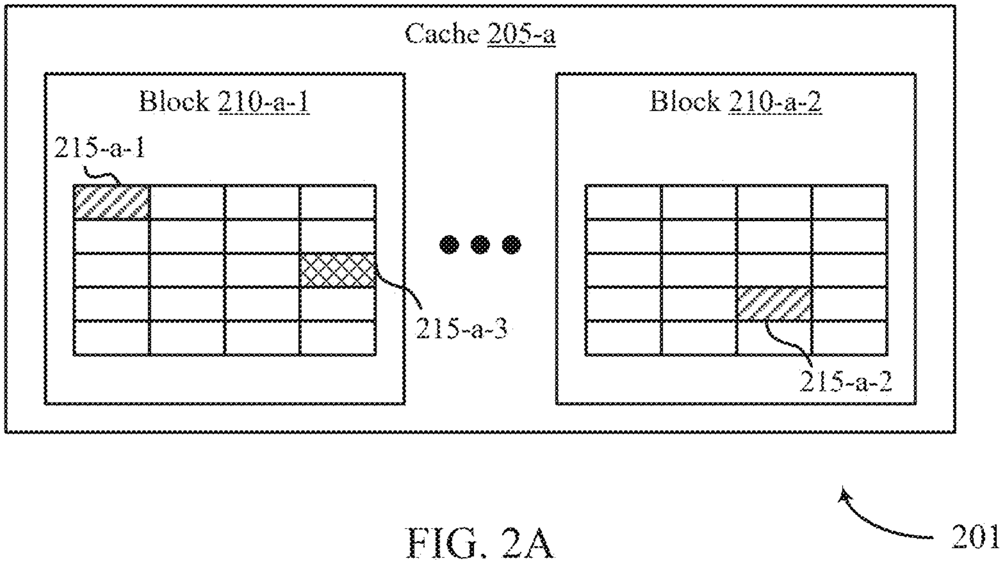
FIGS. 2A and 2B show examples of a data storage scheme and a data mapping scheme that support L2P mapping for ZNS memory systems with a data cache in accordance with examples as disclosed herein.
Figure 2B:
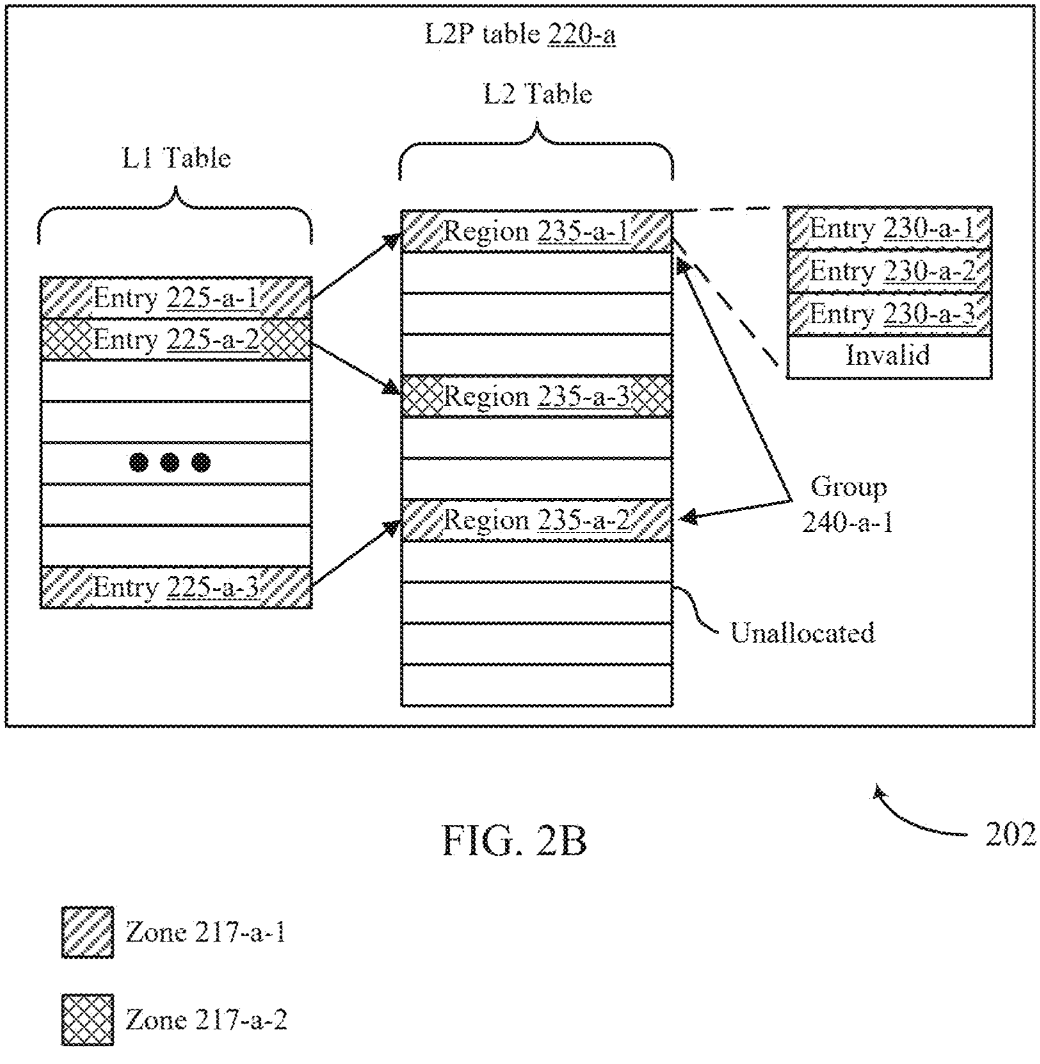

FIGS. 2A and 2B show examples of data storage scheme 201 and a data mapping scheme 202, respectively, that support L2P mapping for ZNS memory systems with a data cache in accordance with examples as disclosed herein. The data storage scheme 201 and the data mapping scheme 202 may implement, or be implemented by, one or more aspects of the system 100. For example, the data storage scheme 201 and the data mapping scheme 202 may be examples of data stored to various portions of memory within a memory system, which may be an example of a memory system 110 described with reference to FIG. 1. In some cases, the data storage scheme 201 and the data mapping scheme 202 may illustrate storing data at a cache of the memory system in accordance with an L2P table, and transferring (e.g., copying, moving) the data to a zone in a corresponding portion of a memory array, such as within a memory device 130 described with reference to FIG. 1.

Referring to FIG. 2A, the data storage scheme 201 may illustrate a cache 205, such as a cache 205-*a*, for temporary data storage of data received from a host system before transfer of the data to one or more zones of memory by a memory system (e.g., the memory system 110). The cache 205-*a* may be an example of a persistent (e.g., non-volatile) array of memory cells. For example, the cache 205-*a* may include multiple blocks 210 (e.g., which may be examples of blocks 170 described with reference to FIG. 1) including respective sets of memory cells, which may be sets of SLCs, or some other type of cell to leverage relatively quicker access speeds associated with SLCs, and may be referred to as an SLC cache SSD (e.g., cache SSD storage that stores data tracked by an L2P table). The blocks 210 may include a block 210-*a*-1 (e.g., a first block, NAND block 0) and a block 210-*a*-2 (e.g., a last block, NAND block N), and may, in some cases, additionally include one or more blocks 210 between the block 210-*a*-1 and the block 210-*a*-2 (e.g., N may be any integer value). Each block 210 may be partitioned in terms of TUs, which may represent a fixed quantity of storage space addressable by an L2P table (e.g., a minimum addressable unit of data, such as 4 KB). For example, the block 210-*a*-1 and the block 210-*a*-2 may each include one or more TUs of data 215 corresponding to one or more respective zones 217 in a memory array (e.g., to which the data 215 may later be stored), which may be data stored to various portions of the cache 205-*a*. It should be noted that the cache 205 may include TUs storing data associated with any quantity of zones 217 and in any ordering within the cache 205 (e.g., data for various zones 217 may be randomly interleaved within the cache 205, such as in order of receipt from a host system). Further, although the cache 205 may in some cases be referred to as an SLC cache, the cache 205 may in some examples represent any cache for storing data (e.g., in DRAM, in SRAM, including other types of memory cells, or the like).

Referring to FIG. 2B, the data mapping scheme 202 (e.g., a ZNS SLC Cache L2 Mapping Diagram) may illustrate an L2P table 220, such as an L2P table 220-*a*. The L2P table 220-*a* may represent an L2P table using an L2P mechanism for one or more SSDs. In some cases, the L2P table 220-*a* may include multiple layers. For example, the L2P table 220-*a* may be a two-layer table used map each TU (e.g., 4 KB or 16 KB) to a physical location within a NAND device (e.g., a TU may be a single or small quantity of host LBAs). For example, the L2P table 220-*a* may include an L1 table and an L2 table. In some examples, the L1 table may include a list of entries 225, where each entry 225 may include, or represent, a pointer (e.g., a DRAM pointer held in DRAM) that may map a host LBA range to one or more L2P entries 230 of the L2 table, where the L2P entries 230 may include the individual physical NAND addresses (FPA) for each specific TU. In some cases, a FLASH translation layer (FTL) may manage the L1 and L2 tables of the L2P table 220-*a*. The L2P table 220-*a* may be stored in DRAM memory, in the cache 205-*a*, or both. For example, the L2P table 220-*a* may, in some examples, be stored in a portion of the cache 205-*a* that includes volatile memory cells or may be stored elsewhere within a memory system, as described with reference to FIG. 1. In some cases, the L2P table 220-*a* may support SLC caching using the cache 205-*a* as described herein. That is, the L2P table 220-*a* may include mapping information that maps logical addresses associated with data to physical addresses within the cache 205-*a* at which the data is stored.

In some cases, entries of the L2 table, such as L2P entries 230, may be periodically copied to non-volatile storage as the entries become dirty (e.g., modified through writes and folding). When a page worth of entries become dirty (e.g., a page of 16 KB), corresponding entries may be gathered and copied to memory cells within the cache 205-*a* (e.g., SLC NAND memory cells) to persist the L2 table. At power initialization time, pieces of the table may be used to reconstruct or rebuild the table back in DRAM memory. However, persistence and rebuilding of the L2P table, such as the L2P table 220-*a*, as well as SLC caching of the L2P table may reduce performance in a memory device by increasing write amplification, for example, when writing a relatively large quantity of L2 entries to non-volatile storage for persistence. ZNS may involve a smaller L2P table than other memory structures by holding addresses corresponding to the cache 205-*a*, where data mapping for the multiple-level memory cells within the ZNS memory arrays of the memory system may be performed using a ZMT, which may be smaller than the L2P entries to reduce memory usage. For example, an L2P table may be managed so that data in the cache 205-*a* is covered by the L2 mapping L2P entries, where an L1 table or L2 table may be fully allocated in an L2P area when a zone is opened, and such L2P regions may remain allocated until a zone is reset or is migrated from the cache 205-*a* to memory. After migration to memory from the cache 205-*a*, a relatively simple mapping may be used via the ZMT (e.g., one entry per zone, the whole zone may be held in a contiguous block of QLC NAND storage after migration). However, in an SLC cached ZNS drive, an SLC cache may cover a full logical address (e.g., LBA) space of a drive (e.g., SSD) even if a fraction of user data is stored in the cache at a time, which may increase an L2P table size and, consequently, memory usage. Thus, using a two-layer table to manage the cache, the drive may move data within the cache in and out of DRAM to stay within limits of available DRAM memory, resulting in varying performance.

As described herein, L2 regions may be utilized to populate an L2P table. For example, the L2P table 220 may utilize the L1 and L2 structures and state tracking mechanisms to hold and track L2P table information in an SLC cached ZNS drive, where the cache 205-*a* may be mapped by populating the L2 table with L2 regions 235 to cover an LBA space of the cache 205. In some cases, L2P entries 230 may be organized in linear regions, or L2 regions 235, that make up the L2 table, where each L2 region 235 (e.g., linear region) may represent and include a group of L2P entries 230 in the L2 table (e.g., a quantity of L2P entries, such as ~512 bytes, or some other quantity), and where each L2 region 235 may hold a corresponding entry 225 in the L1 table. For example, an entry 225-*a*-1 in the L1 table may point to a region 235-*a*-1 including L2P entries 230-*a*-1 and 230-*a*-2 which may include physical addresses for data 215-*a*-1 and 215-*a*-2, respectively, within the block 210-*a*-1 and 210-*a*-2 of the cache 205-*a* (e.g., a NAND cache). The L2 regions 235 may allow an SSD to have L2P entries stored in DRAM that allow a layer of indirection between host logical blocks (e.g., blocks 210) and a physical location to which data is stored on NAND media (e.g., within the cache 205-*a* or another NAND device).

L2 regions 235 may enable sparse L2P table population. For example, the cache 205-*a* may support ZNS L2 Region caching according to the L2P table 220, where ZNS L2 Region caching may represent loading and unloading the regions 235 (e.g., sections of the L2P table 220) so that data in the cache 205-*a* (e.g., SLC cache) may be mapped with a L2P entry. L2 Regions may be managed by a drive, and may be moved in and out of DRAM so cache data 215 may have a mapping entry (e.g., L2P entry 230) while data is resident in the cache 205-*a*. As new data is added to the cache 205-*a* (e.g., as new zones are opened), L2 regions 235 may be allocated. As data is moved out of the cache 205-*a* (e.g., migrated to QLC), the entries (e.g., entries 230 and entries 225) may be invalidated and freed from the L2P L1 and L2 tables, or deallocated. Thus, by using L2 regions 235, the L2P table 220 may store a subset of addresses corresponding to open zones 217 while still covering a full logical address space of an SSD. In some examples, the cache 205-*a* may hold data corresponding to enough zones 217 to meet a maximum open requirement and data for any zones that might be migrating. DRAM may, in some cases, be sized to support holding L2 regions for data for each of the zones 217 stored to the cache 205-*a*. In some cases, evicting L2 regions 235 may involve L2 region victim selection, where loading may be performed when zones are opened, and eviction may be performed on zone reset or migration completion.

In some examples, on a ZNS SSD, there may not be enough DRAM available to hold a total quantity of L2P regions to cover a full LBA space. For example, a device may include enough DRAM for mapping an LBA of the cache 205-*a*, which may be a few percent of an overall address space. Therefore, L2 Regions 235 may be deallocated (e.g., evicted) before new L2 Regions 235 may be added to the DRAM (e.g., when DRAM is full). As discussed, in ZNS, allocation may be performed when a zone becomes active (e.g., zone open), and may be deallocated when the zone finishes migration (e.g., zone close). When a zone 217 is opened, there may be no valid data in the zone. Therefore, L2 Regions 235 may be empty and may not be loaded from NAND storage, but allocated in DRAM as empty L2 Regions. L2 regions 235 for a single zone 217 may be allocated in a sequential block covering an integer quantity of regions 235. L2 Region slots may be allocated in DRAM, and region pointers may be stored in the L1 Table. L2 Regions 235 may be initialized to random information, or information that may be irrelevant as any read to this data would be unmapped data. In such cases, firmware may be aware of invalid data as reads to a zone may be beyond a ZNS write pointer (e.g., detected in the ZNS read preprocessing). The firmware may initialize such entries to unmapped data to simplify implementation or for debugging or error handling.

When opening a zone 217 (e.g., in response to indication, trigger, or command from a host system), DRAM for storing corresponding L2 Regions 235 (e.g., of an L2P table 220) may be allocated as a group of L2 Regions (e.g., to cover a single zone 217). A group of L2 Regions 235 for a zone may be allocated and deallocated together, which memory may be referred to as an L2 region group 240. For example, when opening the zone 217-*a*-1, the regions 235-*a*-1 and 235-*a*-2 of an L2 region group 240-*a*-1 may be allocated for data 215 corresponding to the zone 217-*a*-1, and which may be stored in the cache 205-*a*. Each L2 region group size of memory may come from any location of an L2 cache area (e.g., in DRAM) of the cache 205-*a*. The L2 cache 205-*a* area may be tracked, allocated, and deallocated dynamically as zones 217 are opened and finally migrated to the memory array storage (e.g., QLC NAND). One or more zones 217 may be opened at a time. For example, both zones 217-*a*-1 and zone 217-*a*-2 may be opened at a same time, where corresponding data 215 may be mixed within the cache 205-*a* (e.g., as SLC may be random according to times of write and order of writes, so parts of a same group 240 may not be in order, or may be in random sections of an SLC cache). For example, region 235-*a*-2 may point to one or more entries 230 for data 215-*a*-3 of the zone 217-*a*-2, and may be in between regions 235-*a*-1 and 235-*a*-2 of the zone 217-*a*-1. This may allow faster writing to the cache 205-*a*, where each region 235 of a zone 217 may be written to the corresponding zone 217 (e.g., sequentially). As described herein, a quantity of zones opened at a same time may fill the cache or satisfy a threshold quantity of zones 217 allowed to be open at a same time.

In some examples, for memory allocation management, a software stack may be created to track free L2 region group 240 slots in DRAM where each group 240 may be allocated or freed. For example, an entry may be removed from a free list each time an L2 region group 240 is allocated, and may be added back after data for a corresponding zone 217 is removed from the cache 205-*a* (e.g., after QLC migration completes, or the zone is reset). The free list (e.g., an L2 DRAM Region Slot Free List) may in some cases be volatile (e.g., not persisted) and may be rebuilt (e.g., repopulated, generated) when L2 regions 235 are loaded from NAND storage on power up (e.g., may be modified and the L1 DRAM pointers may be updated for each L2 region 235 load).

As a zone 217 becomes written (e.g., while a zone is in an open state), corresponding L2 regions 235 may become mapped in a sequential order during region usage. After each entry 230 is mapped, host system reads may be processed for corresponding LBAs, and corresponding data 215 may be read from memory of the cache 205-*a*. For ZNS, the L2P entries 230 for an open zone 217 may hold physical addresses that may possibly reduce a size of the NAND address. Once the data 215 is moved out of the cache 205-*a*, the entries may no longer be mapped in the L1 or L2 layers of the L2P table 220, and the data 215 (e.g., user data) may be stored in the memory arrays with corresponding mapping information stored in a ZMT. In some examples, one or more write operations, among other operations (e.g., reads), may be performed while a zone is open.

Once a zone becomes full, so that a threshold quantity of entries 230 or of regions 235 each including a threshold quantity of entries is satisfied (e.g., a value is greater than the threshold, a value greater than or equal to the threshold), a zone 217 may move to a full state. The zone 217 may similarly move to a full state if a host system finishes one or more access operations, such as writing to the zone 217. The L2 regions 235 may, in some cases, no longer be updated at the time that the zone 217 moves to the full state. If the zone 217 is reset before corresponding data is migrated, one or more L2 regions 235 may be deallocated, and L1 entries 225 may be updated to represent unmapped data using an FTL. When a zone 217 closes, the zone 217 may become a candidate for migration out of the cache 205-*a*, and may wait to be selected to start migration into memory. When the zone 217 becomes ready for migration, L2 Regions 235 may wait (allocated in DRAM) for migration to begin, and once migration begins, data may be read from a cache 205-*a* (e.g., an SLC cache) using L2P lookups to locate the data, and may be rewritten to the memory arrays (with each zone to a corresponding QLC block). After migration completes, a zone management entry in a ZMT may be updated to reflect a starting physical location in memory. In some cases, at this time, associated L2 regions 235 (e.g., of a corresponding L2 region group 240) may be deallocated, and an L1 table may be updated to reflect a new deallocated state of the L2 Regions 235. Based on (e.g., after, at the time of) deallocation, memory of the L2 region group may be placed onto a free list so that the L2 region group may be allocated to a next zone 217 opened by a host system.

In some examples, the L2P table 220 may support L2 Table persistence (e.g., a drop mechanism). For example, after each write operation of one or more write operations, L2 regions 235 may become dirty and may become candidates to be copied to an FTL area in NAND memory cells. When enough regions 235 become dirty, so that a threshold quantity of dirty L2 regions is satisfied (or in case of a planned or unplanned power-off event), the L2 regions 235 may be copied to the NAND storage. Additionally, or alternatively, although the L2P table 220-*a* may be described with respect to two layers, including an L1 table and an L2 table, an L2P table 220 may include any quantity of layers and sub-tables. Further, although aspects of FIGS. 2A and 2B may be described regarding ZNS NAND memory devices, the methods described herein may apply to any memory architecture, including non-ZNS NAND memory devices, as well as other types of memory.

In some cases, L2 region 235 allocation in some memory systems may involve loading L2 regions 235 at initialization time, which may, in some cases, endure longer than an allowed "time to ready" limit to load all the L2 regions 235. Thus, loading may start at initialization time, but after time to ready, region loading may continue in one or more background operations, or entries may be loaded "on demand" if a read request is received and one or more entries are to be used. In some examples, L2 regions 235 may not be removed or deallocated from DRAM. For example, to reduce an amount of DRAM required by the SSD (e.g., for cost savings), a size of an L2P mapping unit may be increased (e.g., using larger 16 KB TUs), or L2 regions 235 may be removed from DRAM, and DRAM may be treated as a cache of L2 regions 235 as described herein. If reads and writes enter a system where an L2 region 235 is not loaded, the system may retrieve the L2 region 235 from NAND storage before a standard command processing may continue. In some cases, such processes may involve two serial reads to NAND storage and may degrade performance and QoS of a drive, but may decrease a drive cost. In some examples, a system may include one or more algorithms for deciding which L2 Regions 235 to remove from DRAM while maximizing L2 Region "hits" (e.g., use of L2 regions).

Figure 3:
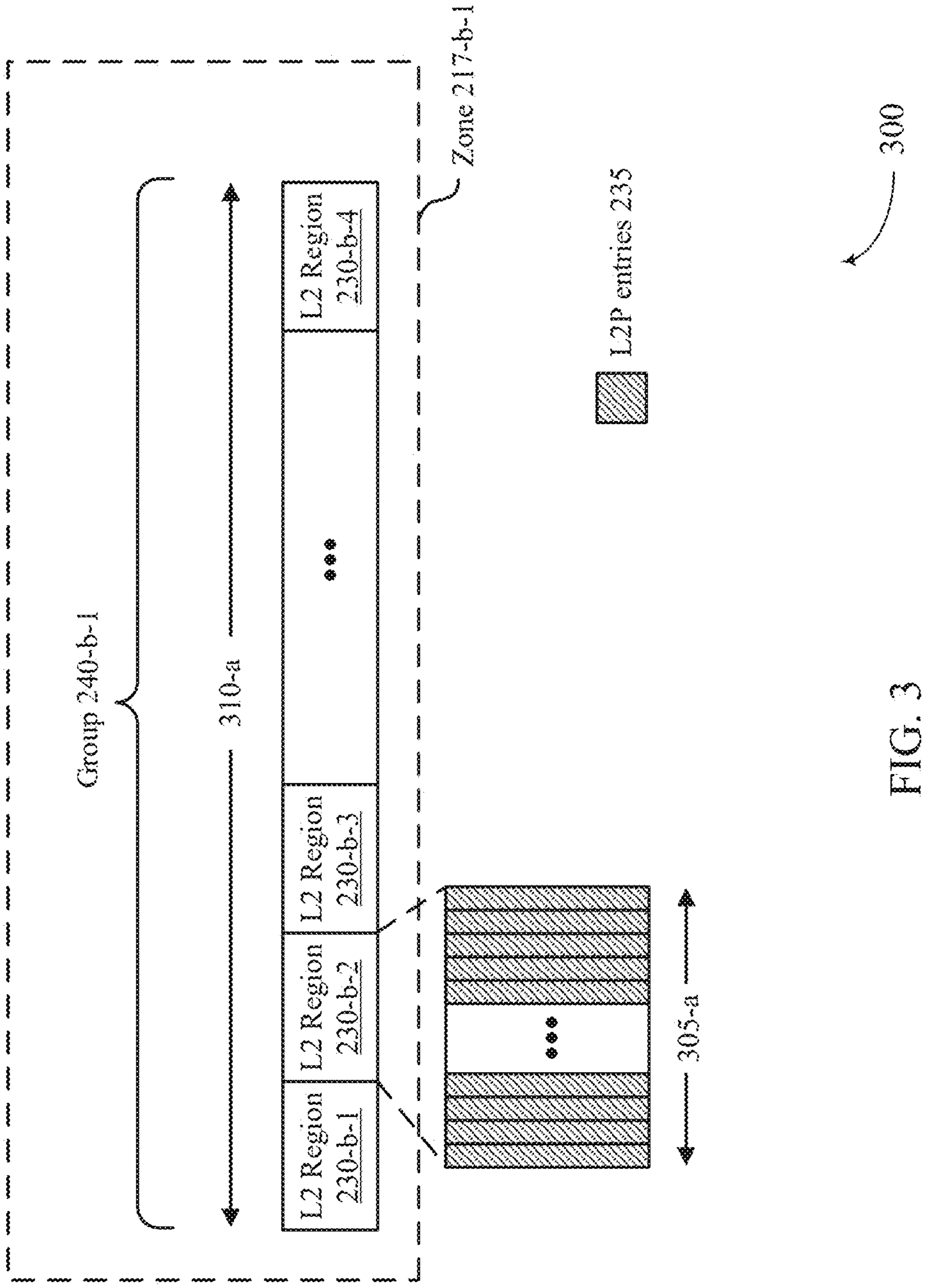
FIG. 3 shows an example of a data mapping scheme that supports L2P mapping for ZNS memory systems with a data cache in accordance with examples as disclosed herein.

FIG. 3 shows an example of a data mapping scheme 300 that supports L2P mapping for ZNS memory systems with a data cache in accordance with examples as disclosed herein. The data mapping scheme 300 may implement, or be implemented by, one or more aspects of the system 100, the data storage scheme 201, and the data mapping scheme 202. For example, the data mapping scheme 300 illustrates examples of data stored to various portions of memory within a memory system, which may be an example of a memory system 110 described with reference to FIG. 1. In some cases, the data mapping scheme 300 may illustrate an L2P mapping for data of a zone 217-*b*-1 of a group 240-*b*-1 in accordance with a sparse L2 table mapping. For example, a memory system may open the zone 217-*b*-1 and may allocate an L2 region group 240-*b*-1 including L2 regions 235-*b*-1, 230-*b*-2, 230-*b*-3, through 230-*b*-4. Notably, the L2 regions 235-*b*-1 through 230-*b*-4 may each include one or more L2P entries 230 pointing to physical locations within a cache (e.g., the cache 205-*a*) storing corresponding data 215, and may be in any arrangement within an L2 table (e.g., may be non-contiguously arrange with respect to each other region 235 of the group 240-*b*-1), including corresponding entries 230 within an L1 table. The L1 and L2 tables of the L2P table may be stored in DRAM as described herein.

In some examples, an amount of DRAM used by the L2 regions 235-*b*-1 through 230-*b*-4 may be decreased through L2 region caching. For example, DRAM memory estimation may be based on L2 regions 235 covering the SLC cache (and not a full drive). Further, the L2 regions 235 may hold different quantities of entries, so that a single L2 region 235 may not cross a zone boundary. Additionally, or alternatively, a NAND address may be smaller in size as it may address the area covered by the SLC cache without addressing other areas.

In some cases, one or more L2 regions 235 may include a maximum supported quantity of L2P entries within a single L2 region size 305, such as an L2 region size 305-*a*. In ZNS, one or more variables may be determined to avoid mapping complexity due to a zone boundary being placed in a middle of an L2 region 235 (e.g., splitting an L2 region 235 across multiple zones 217). For example, a quantity of L2P entries 230 (e.g., in each L2 region size 305) may be reduced to a value divisible by a zone size 310, such as the zone size 310-*a* of the zone 271-*b*-1. In some examples, there may not be a divisible (e.g., "clean") value for the zone size 310-*a*. In such cases, the zone size 310-*a* may also be reduced so that the zone 217-*b*-1 may include an integer quantity of L2 Regions 235 and avoid boundary overlap. Reducing L2 region sizes 305 and TUs in zone sizes 310 (e.g., by a few entries) may thus align L2 region boundaries with zone boundaries, reducing write amplification by avoiding additional tracking of data crossing into still open zones, while simplifying L2P table management. In some examples, such alignment and reduction may result in unused space in both QLC NAND storage (e.g., within the memory occupied by the data for a zone 217) and within L2 region 235 DRAM (e.g., within an L2P table 220 or within L2 regions 235 of DRAM space storing an L2P table 220). In some cases, unused space in L2 regions 235 or within a zone 217 may be repurposed to store additional information, such as zone metadata or host zone descriptor extension (ZDE) information.

Figure 4:
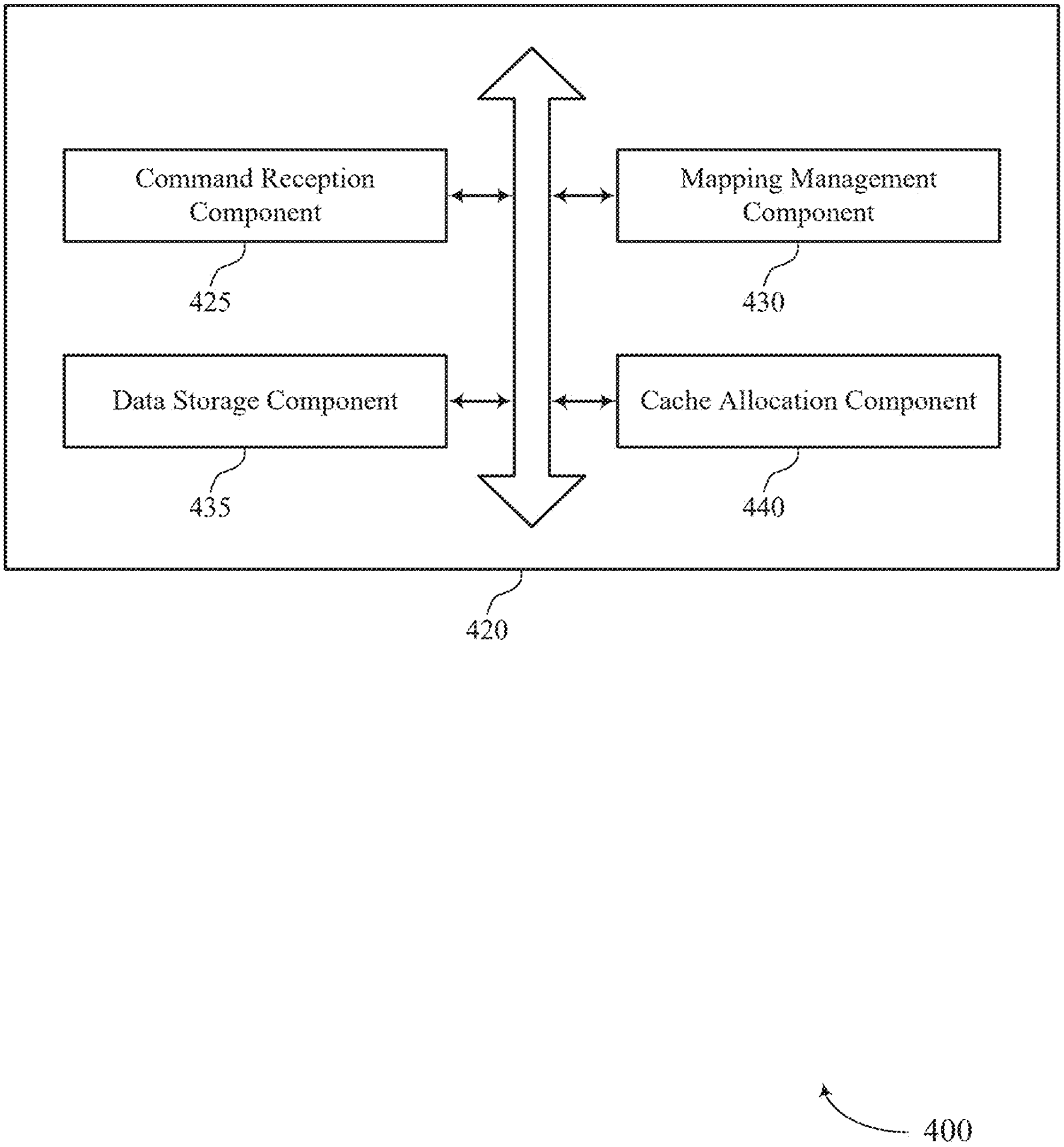
FIG. 4 shows a block diagram of a memory system that supports L2P mapping for ZNS memory systems with a data cache in accordance with examples as disclosed herein.

FIG. 4 shows a block diagram 400 of a memory system 420 that supports L2P mapping for ZNS memory systems with a data cache in accordance with examples as disclosed herein. The memory system 420 may be an example of aspects of a memory system as described with reference to FIGS. 1 through 3. The memory system 420, or various components thereof, may be an example of means for performing various aspects of L2P mapping for ZNS memory systems with a data cache as described herein. For example, the memory system 420 may include a command reception component 425, a mapping management component 430, a data storage component 435, a cache allocation component 440, or any combination thereof. Each of these components, or components of subcomponents thereof (e.g., one or more processors, one or more memories), may communicate, directly or indirectly, with one another (e.g., via one or more buses).

The command reception component 425 may be configured as or otherwise support a means for receiving, by a memory system, a write command including data and a set of LBAs associated with the data, the data for storage in a memory array of the memory system, where the set of LBAs is associated with one or more zones of memory cells of a plurality of zones of memory cells in the memory array. The mapping management component 430 may be configured as or otherwise support a means for store, to a cache of the memory system based at least in part on the write command, one or more entries that map the set of LBAs to respective physical addresses of a plurality of physical addresses in the cache, where each entry of the one or more entries includes mapping information for a respective zone of the one or more zones of memory cells. The data storage component 435 may be configured as or otherwise support a means for writing the data to the respective physical addresses in the cache based at least in part on storing the one or more entries in the cache. In some examples, the data storage component 435 may be configured as or otherwise support a means for transferring the data from the cache to the one or more zones in the memory array based at least in part on writing the data to the respective physical addresses in the cache.

In some examples, to support storing the one or more entries to the cache, the mapping management component 430 may be configured as or otherwise support a means for storing the one or more entries to an L2P table that maps a plurality of LBAs including the set of LBAs to the plurality of physical addresses in the cache of the memory system.

In some examples, the L2P table includes a first table of one or more first entries and a second table of one or more second entries. In some examples, the second table includes the one or more entries. In some examples, each first entry of the first table corresponds to a respective second entry of the second table.

In some examples, the cache allocation component 440 may be configured as or otherwise support a means for allocating, based at least in part on the write command including the data and the set of LBAs associated with the data, one or more portions of the cache for storing one or more groups of entries, each group of entries associated with a respective zone of the one or more zones, where storing the one or more entries to the cache is based at least in part on the allocating.

In some examples, the cache allocation component 440 may be configured as or otherwise support a means for deallocating the one or more portions of the cache for storing the one or more groups of entries based at least in part on transferring the data from the cache to the one or more zones in the memory array.

In some examples, the cache allocation component 440 may be configured as or otherwise support a means for updating a list of available portions of the cache based at least in part on the allocating, the deallocating, or both.

In some examples, to support transferring the data from the cache to the one or more zones in the memory array, the data storage component 435 may be configured as or otherwise support a means for transferring the data based at least in part on the data being mapped to one or more groups of entries each including at least a threshold quantity of entries, where a first subset of the data associated with a first group of entries is transferred to a first zone of the one or more zones based at least in part on the first group of entries including first mapping information for the first zone.

In some examples, the mapping management component 430 may be configured as or otherwise support a means for copying the one or more entries from the cache to the memory array based at least in part on a quantity of entries in the cache satisfying a threshold, based at least in part on a power off event associated with the memory system, or both.

In some examples, a size of each zone of the one or more zones corresponds to an integer quantity of entries of the one or more entries.

In some examples, the cache includes a plurality of single-level memory cells. In some examples, the memory array includes a plurality of multi-level memory cells.

In some examples, the command reception component 425 may be configured as or otherwise support a means for receiving, by a memory system, a write command including data and a set of logical block addresses associated with the data, the data for storage in a memory array of the memory system, where the set of logical block addresses is associated with one or more zones of memory cells of a plurality of zones of multi-level memory cells in the memory array. In some examples, the mapping management component 430 may be configured as or otherwise support a means for storing, to an L2P table in one or more single-level memory cells of a cache of the memory system based at least in part on the write command, one or more L2P entries that map the set of logical block addresses to respective physical addresses of a plurality of physical addresses in the cache, where each L2P entry of the one or more L2P entries includes mapping information for a respective zone of the one or more zones of memory cells, and where a size of each zone of the one or more zones corresponds to an integer quantity of L2P entries of the one or more L2P entries. In some examples, the data storage component 435 may be configured as or otherwise support a means for writing the data to the respective physical addresses in the cache based at least in part on storing the one or more L2P entries in the L2P table, where the cache is configured to store data for a subset of the plurality of zones that includes the one or more zones. In some examples, the data storage component 435 may be configured as or otherwise support a means for transferring the data from the one or more single-level memory cells of the cache to the one or more zones of multi-level memory cells in the memory array based at least in part on writing the data to the respective physical addresses in the cache. The cache allocation component 440 may be configured as or otherwise support a means for deallocating, based at least in part on copying the data from the cache to the one or more zones in the memory array, one or more portions of the cache allocated for storing one or more groups of L2P entries.

In some examples, the L2P table includes a first table of one or more first entries and a second table of one or more second entries, the second table includes the one or more L2P entries, and each first entry of the first table corresponds to a respective second entry of the second table.

In some examples, the cache allocation component 440 may be configured as or otherwise support a means for allocating, based at least in part on the write command including the data and the set of logical block addresses associated with the data, the one or more portions of the cache for storing the one or more groups of L2P entries, each group of entries associated with a respective zone of the one or more zones, where storing the one or more L2P entries to the L2P table in the one or more single-level memory cells of the cache is based at least in part on the allocating.

In some examples, the cache allocation component 440 may be configured as or otherwise support a means for updating a list of available portions of the cache based at least in part on the allocating, the deallocating, or both.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

Figure 5:
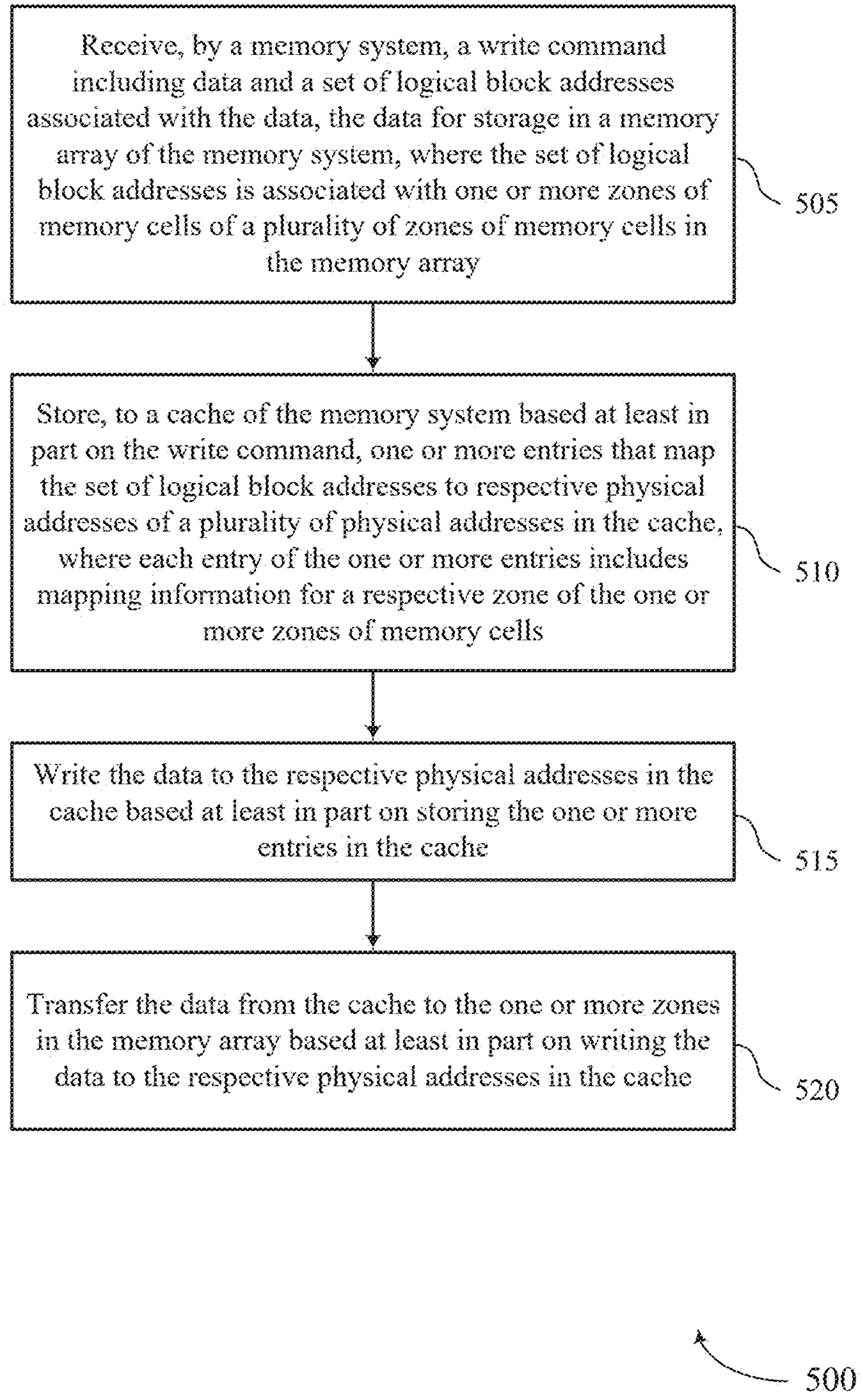
FIGS. 5 and 6 show flowcharts illustrating methods that support L2P mapping for ZNS memory systems with a data cache in accordance with examples as disclosed herein.

FIG. 5 shows a flowchart illustrating a method 500 that supports L2P mapping for ZNS memory systems with a data cache in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving, by a memory system, a write command including data and a set of LBAs associated with the data, the data for storage in a memory array of the memory system, where the set of LBAs is associated with one or more zones of memory cells of a plurality of zones of memory cells in the memory array. In some examples, aspects of the operations of 505 may be performed by a command reception component 425 as described with reference to FIG. 4.

At 510, the method may include store, to a cache of the memory system based at least in part on the write command, one or more entries that map the set of LBAs to respective physical addresses of a plurality of physical addresses in the cache, where each entry of the one or more entries includes mapping information for a respective zone of the one or more zones of memory cells. In some examples, aspects of the operations of 510 may be performed by a mapping management component 430 as described with reference to FIG. 4.

At 515, the method may include writing the data to the respective physical addresses in the cache based at least in part on storing the one or more entries in the cache. In some examples, aspects of the operations of 515 may be performed by a data storage component 435 as described with reference to FIG. 4.

At 520, the method may include transferring the data from the cache to the one or more zones in the memory array based at least in part on writing the data to the respective physical addresses in the cache. In some examples, aspects of the operations of 520 may be performed by a data storage component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, by a memory system, a write command including data (e.g., data 215) and a set of LBAs associated with the data, the data for storage in a memory array of the memory system (e.g., memory system 110), where the set of LBAs is associated with one or more zones (e.g., zones 217) of memory cells of a plurality of zones of memory cells in the memory array; store, to a cache (e.g., cache 205, cache in DRAM or SRAM of a NAND device such as a local memory 120, cache in memory devices 130 or other memory systems 110, cache in DRAM or SRAM of a host system 105, SLC cache in a NAND memory cells) of the memory system based at least in part on the write command, one or more entries (e.g., entries 225, entries 230) that map the set of LBAs to respective physical addresses of a plurality of physical addresses in the cache, where each entry of the one or more entries includes mapping information for a respective zone of the one or more zones of memory cells; writing the data to the respective physical addresses in the cache (e.g., cache 205, SLC cache in NAND memory cells, cache in DRAM or SRAM) based at least in part on storing the one or more entries in the cache; and transferring the data from the cache to the one or more zones in the memory array based at least in part on writing the data to the respective physical addresses in the cache.

Aspect 2: The method, apparatus, or non-transitory computer-readable medium of aspect 1, where storing the one or more entries to the cache includes operations, features, circuitry, logic, means, or instructions, or any combination thereof for storing the one or more entries to an L2P table (e.g., L2P table 220) that maps a plurality of LBAs including the set of LBAs to the plurality of physical addresses in the cache of the memory system.

Aspect 3: The method, apparatus, or non-transitory computer-readable medium of aspect 2, where the L2P table includes a first table of one or more first entries (e.g., L1 table of entries 225) and a second table of one or more second entries (e.g., L2 table of L2P entries 230); the second table includes the one or more entries (e.g., L2P entries 230); and each first entry of the first table corresponds to a respective second entry of the second table.

Aspect 4: The method, apparatus, or non-transitory computer-readable medium of any of aspects 1 through 3, further including operations, features, circuitry, logic, means, or instructions, or any combination thereof for allocating, based at least in part on the write command including the data and the set of LBAs associated with the data, one or more portions of the cache (e.g., one or more groups 240) for storing one or more groups of entries (e.g., one or more L2 regions 235), each group of entries associated with a respective zone of the one or more zones, where storing the one or more entries to the cache is based at least in part on the allocating.

Aspect 5: The method, apparatus, or non-transitory computer-readable medium of aspect 4, further including operations, features, circuitry, logic, means, or instructions, or any combination thereof for deallocating the one or more portions of the cache for storing the one or more groups of entries based at least in part on transferring the data from the cache to the one or more zones in the memory array.

Aspect 6: The method, apparatus, or non-transitory computer-readable medium of aspect 5, further including operations, features, circuitry, logic, means, or instructions, or any combination thereof for updating a list (e.g., a free list) of available portions of the cache based at least in part on the allocating, the deallocating, or both.

Aspect 7: The method, apparatus, or non-transitory computer-readable medium of any of aspects 1 through 6, where transferring the data from the cache to the one or more zones in the memory array includes operations, features, circuitry, logic, means, or instructions, or any combination thereof for transferring the data based at least in part on the data being mapped to one or more groups of entries each including at least a threshold quantity of entries (e.g., zone is full), where a first subset of the data associated with a first group of entries (e.g., data 215 for an L2 region 235 of a group 240) is transferred to a first zone of the one or more zones based at least in part on the first group of entries including first mapping information for the first zone.

Aspect 8: The method, apparatus, or non-transitory computer-readable medium of any of aspects 1 through 7, further including operations, features, circuitry, logic, means, or instructions, or any combination thereof for copying the one or more entries from the cache to the memory array based at least in part on a quantity of entries in the cache satisfying a threshold (e.g., threshold quantity of "dirty" L2 regions), based at least in part on a power off event associated with the memory system, or both.

Aspect 9: The method, apparatus, or non-transitory computer-readable medium of any of aspects 1 through 8, where a size of each zone of the one or more zones corresponds to an integer quantity of entries of the one or more entries (e.g., an integer multiple of the entries).

Aspect 10: The method, apparatus, or non-transitory computer-readable medium of any of aspects 1 through 9, where the cache includes a plurality of single-level memory cells (e.g., SLCs) and the memory array includes a plurality of multi-level memory cells (e.g., MLCs, TLCs, QLCs).

Figure 6:
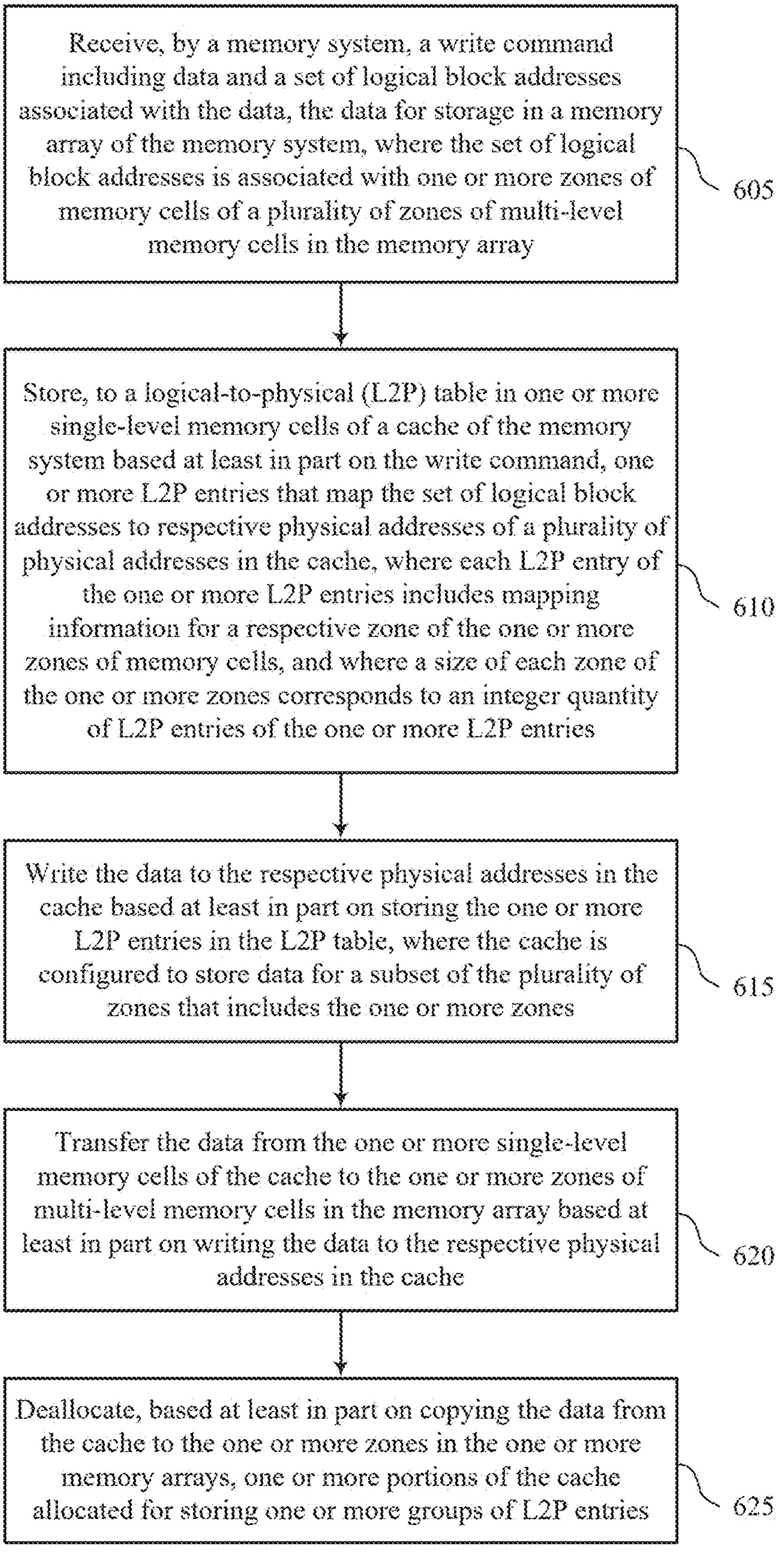

FIG. 6 shows a flowchart illustrating a method 600 that supports L2P mapping for zoned namespace memory systems with a data cache in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include receiving, by a memory system, a write command including data and a set of logical block addresses associated with the data, the data for storage in a memory array of the memory system, where the set of logical block addresses is associated with one or more zones of memory cells of a plurality of zones of multi-level memory cells in the memory array. In some examples, aspects of the operations of 605 may be performed by a command reception component 425 as described with reference to FIG. 4.

At 610, the method may include storing, to an L2P table in one or more single-level memory cells of a cache of the memory system based at least in part on the write command, one or more L2P entries that map the set of logical block addresses to respective physical addresses of a plurality of physical addresses in the cache, where each L2P entry of the one or more L2P entries includes mapping information for a respective zone of the one or more zones of memory cells, and where a size of each zone of the one or more zones corresponds to an integer quantity of L2P entries of the one or more L2P entries. In some examples, aspects of the operations of 610 may be performed by a mapping management component 430 as described with reference to FIG. 4.

At 615, the method may include writing the data to the respective physical addresses in the cache based at least in part on storing the one or more L2P entries in the L2P table, where the cache is configured to store data for a subset of the plurality of zones that includes the one or more zones. In some examples, aspects of the operations of 615 may be performed by a data storage component 435 as described with reference to FIG. 4.

At 620, the method may include transferring the data from the one or more single-level memory cells of the cache to the one or more zones of multi-level memory cells in the memory array based at least in part on writing the data to the respective physical addresses in the cache. In some examples, aspects of the operations of 620 may be performed by a data storage component 435 as described with reference to FIG. 4.

At 625, the method may include deallocating, based at least in part on copying the data from the cache to the one or more zones in the memory array, one or more portions of the cache allocated for storing one or more groups of L2P entries. In some examples, aspects of the operations of 625 may be performed by a cache allocation component 440 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 11: A method, apparatus, or non-transitory computer-readable medium including operations, features, circuitry, logic, means, or instructions, or any combination thereof for receiving, by a memory system, a write command including data and a set of logical block addresses associated with the data, the data for storage in a memory array of the memory system, where the set of logical block addresses is associated with one or more zones of memory cells of a plurality of zones of multi-level memory cells in the memory array; storing, to an L2P table in one or more single-level memory cells of a cache of the memory system based at least in part on the write command, one or more L2P entries that map the set of logical block addresses to respective physical addresses of a plurality of physical addresses in the cache, where each L2P entry of the one or more L2P entries includes mapping information for a respective zone of the one or more zones of memory cells, and where a size of each zone of the one or more zones corresponds to an integer quantity of L2P entries of the one or more L2P entries; writing the data to the respective physical addresses in the cache based at least in part on storing the one or more L2P entries in the L2P table, where the cache is configured to store data for a subset of the plurality of zones that includes the one or more zones; transferring the data from the one or more single-level memory cells of the cache to the one or more zones of multi-level memory cells in the memory array based at least in part on writing the data to the respective physical addresses in the cache; and deallocating, based at least in part on copying the data from the cache to the one or more zones in the memory array, one or more portions of the cache allocated for storing one or more groups of L2P entries.

Aspect 12: The method, apparatus, or non-transitory computer-readable medium of aspect 11, where the L2P table includes a first table of one or more first entries and a second table of one or more second entries, the second table includes the one or more L2P entries, and each first entry of the first table corresponds to a respective second entry of the second table.

Aspect 13: The method, apparatus, or non-transitory computer-readable medium of any of aspects 11 through 12, further including operations, features, circuitry, logic, means, or instructions, or any combination thereof for allocating, based at least in part on the write command including the data and the set of logical block addresses associated with the data, the one or more portions of the cache for storing the one or more groups of L2P entries, each group of entries associated with a respective zone of the one or more zones, where storing the one or more L2P entries to the L2P table in the one or more single-level memory cells of the cache is based at least in part on the allocating.

Aspect 14: The method, apparatus, or non-transitory computer-readable medium of aspect 13, further including operations, features, circuitry, logic, means, or instructions, or any combination thereof for updating a list of available portions of the cache based at least in part on the allocating, the deallocating, or both.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 15: A memory system, including: one or more caches including a plurality of memory cells of a first type (e.g., SLC); one or more memory arrays coupled with the one or more caches (e.g., caches 205, caches in DRAM or SRAM of NAND system such as in a local memory 120, caches in memory devices 130 or other memory systems 110, caches in DRAM or SRAM of a host system 105, SLC caches in NAND memory cells) and including a plurality of memory cells of a second type (e.g., QLC), where the plurality of memory cells are included in a plurality of zones (e.g., distributed across, placed within, or associated physically or logically with the zones), each zone including one or more blocks of memory cells; and processing circuitry configured to: receive a write command including data and a set of LBAs associated with the data, the data for storage in the one or more memory arrays, where the set of LBAs is associated with one or more zones of the plurality of zones of the one or more memory arrays; store, to a cache of the one or more caches based at least in part on the write command, one or more entries that map the set of LBAs to respective physical addresses of a plurality of physical addresses in the cache, where each entry of the one or more entries includes mapping information for a respective zone of the one or more zones; writing the data to the respective physical addresses in the cache based at least in part on storing the one or more entries in the cache; and copying the data from the cache to the one or more zones in the one or more memory arrays based at least in part on writing the data to the respective physical addresses in the cache.

Aspect 16: The memory system of aspect 15, where, to store the one or more entries to the cache, the processing circuitry is configured to: store the one or more entries to an L2P table that maps a plurality of LBAs including the set of LBAs to the plurality of physical addresses in the cache of the one or more caches.

Aspect 17: The memory system of aspect 16, where the L2P table includes a first table of one or more first entries and a second table of one or more second entries, the second table includes the one or more entries, and each first entry of the first table corresponds to a respective second entry of the second table.

Aspect 18: The memory system of any of aspects 15 through 17, where the processing circuitry is further configured to: allocate, based at least in part on the write command including the data and the set of LBAs associated with the data, one or more portions of the cache of the one or more caches for storing one or more groups of entries, each group of entries associated with a respective zone of the one or more zones, where storing the one or more entries to the cache is based at least in part on the allocating.

Aspect 19: The memory system of aspect 18, where the processing circuitry is further configured to: deallocate the one or more portions of the cache for storing the one or more groups of entries based at least in part on copying the data from the cache to the one or more zones in the one or more memory arrays.

Aspect 20: The memory system of aspect 19, where the processing circuitry is further configured to: update a list of available portions of the cache based at least in part on the allocating, the deallocating, or both.

Aspect 21: The memory system of any of aspects 15 through 20, where, to copy the data from the cache to the one or more zones in the one or more memory arrays, the processing circuitry is configured to: copy the data based at least in part on the data being mapped to one or more groups of entries each including at least a threshold quantity of entries, where a first subset of the data associated with a first group of entries is copied to a first zone of the one or more zones based at least in part on the first group of entries including first mapping information for the first zone.

Aspect 22: The memory system of any of aspects 15 through 21, where the processing circuitry is further configured to: copy the one or more entries from the cache to the one or more memory arrays based at least in part on a quantity of entries in the cache satisfying a threshold, based at least in part on a power off event associated with the memory system, or both.

Aspect 23: The memory system of any of aspects 15 through 22, where a size of each zone of the one or more zones corresponds to an integer quantity of entries of the one or more entries.

Aspect 24: The memory system of any of aspects 15 through 23, where the plurality of memory cells of the first type in the one or more caches include a plurality of single-level memory cells, and the plurality of memory cells of the second type in the one or more memory arrays include a plurality of multi-level memory cells.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively, (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more caches comprising a plurality of memory cells of a first type;
one or more memory arrays coupled with the one or more caches and comprising a plurality of memory cells of a second type, wherein the plurality of memory cells are included in a plurality of zones, each zone comprising one or more blocks of memory cells; and
processing circuitry configured to:
receive a write command comprising data and a set of logical block addresses associated with the data, the data for storage in the one or more memory arrays, wherein the set of logical block addresses is associated with one or more zones of the plurality of zones of the one or more memory arrays;
store, to a cache of the one or more caches based at least in part on the write command, one or more entries that map the set of logical block addresses to respective physical addresses of a plurality of physical addresses in the cache, wherein each entry of the one or more entries comprises mapping information for a respective zone of the one or more zones;
write the data to the respective physical addresses in the cache based at least in part on storing the one or more entries in the cache; and
copy the data from the cache to the one or more zones in the one or more memory arrays based at least in part on writing the data to the respective physical addresses in the cache.

2. The memory system of claim 1, wherein, to store the one or more entries to the cache, the processing circuitry is configured to:
store the one or more entries to a logical-to-physical (L2P) table that maps a plurality of logical block addresses comprising the set of logical block addresses to the plurality of physical addresses in the cache of the one or more caches.

3. The memory system of claim 2, wherein:
the L2P table comprises a first table of one or more first entries and a second table of one or more second entries,
the second table comprises the one or more entries, and
each first entry of the first table corresponds to a respective second entry of the second table.

4. The memory system of claim 1, wherein the processing circuitry is further configured to:
allocate, based at least in part on the write command comprising the data and the set of logical block addresses associated with the data, one or more portions of the cache of the one or more caches for storing one or more groups of entries, each group of entries associated with a respective zone of the one or more zones, wherein storing the one or more entries to the cache is based at least in part on the allocating.

5. The memory system of claim 4, wherein the processing circuitry is further configured to:
deallocate the one or more portions of the cache for storing the one or more groups of entries based at least in part on copying the data from the cache to the one or more zones in the one or more memory arrays.

6. The memory system of claim 5, wherein the processing circuitry is further configured to:
update a list of available portions of the cache based at least in part on the allocating, the deallocating, or both.

7. The memory system of claim 1, wherein, to copy the data from the cache to the one or more zones in the one or more memory arrays, the processing circuitry is configured to:
copy the data based at least in part on the data being mapped to one or more groups of entries each comprising at least a threshold quantity of entries, wherein a first subset of the data associated with a first group of entries is copied to a first zone of the one or more zones based at least in part on the first group of entries comprising first mapping information for the first zone.

8. The memory system of claim 1, wherein the processing circuitry is further configured to:
copy the one or more entries from the cache to the one or more memory arrays based at least in part on a quantity of entries in the cache satisfying a threshold, based at least in part on a power off event associated with the memory system, or both.

9. The memory system of claim 1, wherein a size of each zone of the one or more zones corresponds to an integer quantity of entries of the one or more entries.

10. The memory system of claim 1, wherein:
the plurality of memory cells of the first type in the one or more caches comprise a plurality of single-level memory cells, and
the plurality of memory cells of the second type in the one or more memory arrays comprise a plurality of multi-level memory cells.

11. A method, comprising:
receiving, by a memory system, a write command comprising data and a set of logical block addresses associated with the data, the data for storage in a memory array of the memory system, wherein the set of logical block addresses is associated with one or more zones of memory cells of a plurality of zones of memory cells in the memory array;
storing, to a cache of the memory system based at least in part on the write command, one or more entries that map the set of logical block addresses to respective physical addresses of a plurality of physical addresses in the cache, wherein each entry of the one or more entries comprises mapping information for a respective zone of the one or more zones of memory cells;

writing the data to the respective physical addresses in the cache based at least in part on storing the one or more entries in the cache; and transferring the data from the cache to the one or more zones in the memory array based at least in part on writing the data to the respective physical addresses in the cache.

12. The method of claim 11, wherein storing the one or more entries to the cache comprises:

storing the one or more entries to a logical-to-physical (L2P) table that maps a plurality of logical block addresses comprising the set of logical block addresses to the plurality of physical addresses in the cache of the memory system.

13. The method of claim 12, wherein:

the L2P table comprises a first table of one or more first entries and a second table of one or more second entries, the second table comprises the one or more entries, and each first entry of the first table corresponds to a respective second entry of the second table.

14. The method of claim 11, further comprising:

allocating, based at least in part on the write command comprising the data and the set of logical block addresses associated with the data, one or more portions of the cache for storing one or more groups of entries, each group of entries associated with a respective zone of the one or more zones, wherein storing the one or more entries to the cache is based at least in part on the allocating.

15. The method of claim 14, further comprising:

deallocating the one or more portions of the cache for storing the one or more groups of entries based at least in part on transferring the data from the cache to the one or more zones in the memory array.

16. The method of claim 15, further comprising:

updating a list of available portions of the cache based at least in part on the allocating, the deallocating, or both.

17. The method of claim 11, wherein transferring the data from the cache to the one or more zones in the memory array comprises:

transferring the data based at least in part on the data being mapped to one or more groups of entries each comprising at least a threshold quantity of entries, wherein a first subset of the data associated with a first group of entries is transferred to a first zone of the one or more zones based at least in part on the first group of entries comprising first mapping information for the first zone.

18. The method of claim 11, further comprising:

copying the one or more entries from the cache to the memory array based at least in part on a quantity of entries in the cache satisfying a threshold, based at least in part on a power off event associated with the memory system, or both.

19. The method of claim 11, wherein a size of each zone of the one or more zones corresponds to an integer quantity of entries of the one or more entries.

20. The method of claim 11, wherein:

the cache comprises a plurality of single-level memory cells, and the memory array comprises a plurality of multi-level memory cells.

21. A non-transitory computer-readable medium storing code, the code comprising instructions executable by one or more processors to:

receive, by a memory system, a write command comprising data and a set of logical block addresses associated with the data, the data for storage in a memory array of the memory system, wherein the set of logical block addresses is associated with one or more zones of memory cells of a plurality of zones of memory cells in the memory array;

store, to a cache of the memory system based at least in part on the write command, one or more entries that map the set of logical block addresses to respective physical addresses of a plurality of physical addresses in the cache, wherein each entry of the one or more entries comprises mapping information for a respective zone of the one or more zones of memory cells;

write the data to the respective physical addresses in the cache based at least in part on storing the one or more entries in the cache; and transfer the data from the cache to the one or more zones in the memory array based at least in part on writing the data to the respective physical addresses in the cache.

22. The non-transitory computer-readable medium of claim 21, wherein the instructions to store the one or more entries to the cache are executable by the one or more processors to:

store the one or more entries to a logical-to-physical (L2P) table that maps a plurality of logical block addresses comprising the set of logical block addresses to the plurality of physical addresses in the cache of the memory system.

23. The non-transitory computer-readable medium of claim 22, wherein:

the L2P table comprises a first table of one or more first entries and a second table of one or more second entries, the second table comprises the one or more entries, and each first entry of the first table corresponds to a respective second entry of the second table.

24. A memory system, comprising:

one or more caches comprising a plurality of single-level memory cells;

one or more memory arrays coupled with the one or more caches and comprising a plurality of multi-level memory cells, wherein the plurality of multi-level memory cells are included in a plurality of zones, each zone comprising one or more blocks of memory cells; and processing circuitry configured to:

receive a write command comprising data and a set of logical block addresses associated with the data, the data for storage in the one or more memory arrays, wherein the set of logical block addresses is associated with one or more zones of the plurality of zones of the one or more memory arrays;

store, to a logical-to-physical (L2P) table in a cache of the one or more caches based at least in part on the write command, one or more L2P entries that map the set of logical block addresses to respective physical addresses of a plurality of physical addresses in the cache, wherein each L2P entry of the one or more L2P entries comprises mapping information for a respective zone of the one or more zones, and wherein a size of each zone of the one or more zones corresponds to an integer quantity of L2P entries of the one or more L2P entries;

write the data to the respective physical addresses in the cache based at least in part on storing the one or more L2P entries in the L2P table, wherein the cache is configured to store data for a subset of the plurality of zones that comprises the one or more zones;

copy the data from the cache to the one or more zones in the one or more memory arrays based at least in part on writing the data to the respective physical addresses in the cache; and deallocate, based at least in part on copying the data from the cache to the one or more zones in the one or more memory arrays, one or more portions of the cache allocated for storing one or more groups of L2P entries.

25. The memory system of claim 24, wherein:

the L2P table comprises a first table of one or more first entries and a second table of one or more second entries, the second table comprises the one or more L2P entries, and each first entry of the first table corresponds to a respective second entry of the second table.

26. The memory system of claim 24, wherein the processing circuitry is further configured to:

allocate, based at least in part on the write command comprising the data and the set of logical block addresses associated with the data, the one or more portions of the cache for storing the one or more groups of L2P entries, each group of L2P entries associated with a respective zone of the one or more zones, wherein storing the one or more L2P entries to the L2P table in the cache is based at least in part on the allocating.

27. The memory system of claim 26, wherein the processing circuitry is further configured to:

update a list of available portions of the cache based at least in part on the allocating, the deallocating, or both.

28. A method, comprising:

receiving, by a memory system, a write command comprising data and a set of logical block addresses associated with the data, the data for storage in a memory array of the memory system, wherein the set of logical block addresses is associated with one or more zones of multi-level memory cells of a plurality of zones of multi-level memory cells in the memory array;

storing, to a logical-to-physical (L2P) table in one or more single-level memory cells of a cache of the memory system based at least in part on the write command, one or more L2P entries that map the set of logical block addresses to respective physical addresses of a plurality of physical addresses in the cache, wherein each L2P entry of the one or more L2P entries comprises mapping information for a respective zone of the one or more zones of multi-level memory cells, and wherein a size of each zone of the one or more zones corresponds to an integer quantity of L2P entries of the one or more L2P entries;

writing the data to the respective physical addresses in the cache based at least in part on storing the one or more L2P entries in the L2P table, wherein the cache is configured to store data for a subset of the plurality of zones that comprises the one or more zones;

transferring the data from the one or more single-level memory cells of the cache to the one or more zones of multi-level memory cells in the memory array based at least in part on writing the data to the respective physical addresses in the cache; and deallocating, based at least in part on transferring the data from the cache to the one or more zones in the memory array, one or more portions of the cache allocated for storing one or more groups of L2P entries.

29. The method of claim 28, wherein:

the L2P table comprises a first table of one or more first entries and a second table of one or more second entries, the second table comprises the one or more L2P entries, and each first entry of the first table corresponds to a respective second entry of the second table.

30. The method of claim 28, further comprising:

allocating, based at least in part on the write command comprising the data and the set of logical block addresses associated with the data, the one or more portions of the cache for storing the one or more groups of L2P entries, each group of L2P entries associated with a respective zone of the one or more zones, wherein storing the one or more L2P entries to the L2P table in the one or more single-level memory cells of the cache is based at least in part on the allocating.

* * * * *